(12) United States Patent
He

(10) Patent No.: US 11,488,550 B2
(45) Date of Patent: Nov. 1, 2022

(54) DISPLAY PANEL AND DISPLAY APPARATUS FOR IMPROVING COLOR CAST BASED ON DESIGN SPACE AND FREEDOM

(71) Applicant: HKC CORPORATION LIMITED, Shenzhen (CN)

(72) Inventor: HuaiLiang He, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 866 days.

(21) Appl. No.: 16/327,326

(22) PCT Filed: Dec. 12, 2018

(86) PCT No.: PCT/CN2018/120477
§ 371 (c)(1),
(2) Date: Feb. 22, 2019

(87) PCT Pub. No.: WO2020/113632
PCT Pub. Date: Jun. 11, 2020

(65) Prior Publication Data
US 2021/0358429 A1 Nov. 18, 2021

(30) Foreign Application Priority Data

Dec. 4, 2018 (CN) .......................... 201822025970.3

(51) Int. Cl.
*G09G 3/36* (2006.01)
(52) U.S. Cl.
CPC ... *G09G 3/3607* (2013.01); *G09G 2300/0421* (2013.01); *G09G 2300/0465* (2013.01); *G09G 2320/0233* (2013.01); *G09G 2320/0242* (2013.01)

(58) Field of Classification Search
None
See application file for complete search history.

(56) References Cited

U.S. PATENT DOCUMENTS

| 2003/0117422 A1* | 6/2003 | Hiyama | G09G 3/3659 345/690 |
| 2009/0195483 A1* | 8/2009 | Naugler, Jr. | G09G 3/3233 345/76 |

(Continued)

FOREIGN PATENT DOCUMENTS

| CN | 103278977 A | 9/2013 |
| CN | 104216187 A | 12/2014 |

(Continued)

OTHER PUBLICATIONS

International Search Report issued in corresponding International application No. PCT/CN2018/120477, dated Aug. 27, 2019.

(Continued)

*Primary Examiner* — Benjamin C Lee
*Assistant Examiner* — Emily J Frank

(57) ABSTRACT

The present application discloses a display panel and a display apparatus. The display panel includes: a first substrate, pixels, data lines, and scan lines. The pixels include first pixels and second pixels. The first pixels each include a first primary pixel and first secondary pixel, and the second pixels each include a second primary pixel and a second secondary pixel. The first primary pixel and the first secondary pixel are connected to an $n^{th}$ row of scan line and an $n^{th}$ row of data line, and the second primary pixel and the second secondary pixel are connected to the $n^{th}$ row of scan line and the $n^{th}$ row of data line. The first secondary pixel is connected to a first pull-down circuit, and the second secondary pixel is connected to a second pull-down circuit.

13 Claims, 5 Drawing Sheets

(56) References Cited

U.S. PATENT DOCUMENTS

| | | | |
|---|---|---|---|
| 2009/0237343 A1* | 9/2009 | Shibazaki | G09G 3/3648 345/92 |
| 2010/0103339 A1* | 4/2010 | Shimoshikiryoh | G09G 3/3648 349/39 |
| 2015/0002561 A1* | 1/2015 | Yao | G09G 3/3607 345/694 |
| 2016/0293116 A1* | 10/2016 | Wang | G09G 3/3696 |
| 2016/0327819 A1* | 11/2016 | Chao | G09G 3/3659 |
| 2017/0162099 A1* | 6/2017 | Jin | G09G 3/2003 |
| 2018/0218696 A1* | 8/2018 | Du | G09G 3/3659 |
| 2018/0315801 A1* | 11/2018 | Matsueda | G09G 3/3225 |
| 2019/0066598 A1* | 2/2019 | Kim | G09G 3/3258 |
| 2019/0155436 A1* | 5/2019 | Jin | G06F 3/0416 |
| 2019/0197950 A1* | 6/2019 | Shibusawa | G09G 3/3233 |
| 2021/0201805 A1* | 7/2021 | Feng | G09G 3/3258 |
| 2021/0366400 A1* | 11/2021 | Feng | G11C 19/28 |

FOREIGN PATENT DOCUMENTS

| | | |
|---|---|---|
| CN | 104360556 A | 2/2015 |
| CN | 104460151 A | 3/2015 |
| CN | 104808406 A | 7/2015 |
| KR | 20120052762 A | 5/2012 |

OTHER PUBLICATIONS

Written Opinion of the International Searching Authority for No. PCT/CN2018/120477.

* cited by examiner

300 Display apparatus

200 Display panel

DISPLAY PANEL AND DISPLAY APPARATUS FOR IMPROVING COLOR CAST BASED ON DESIGN SPACE AND FREEDOM

The present application claims priority to the Chinese Patent Application No. CN201822025970.3, filed with National Intellectual Property Administration on Dec. 4, 2018, and entitled "DISPLAY PANEL AND DISPLAY APPARATUS", which is incorporated herein by reference in its entirety.

TECHNICAL FIELD

The present application relates to the field of display technologies, and in particular, to a display panel and a display apparatus.

BACKGROUND

The description herein provides only background information related to the present application, and does not necessarily constitute the prior art.

With the development and advancement of science and technology, a flat panel display has become a mainstream product of displays due to its thin body, power saving, and low radiation, and is widely applied. The flat panel display includes a thin film transistor-liquid crystal display (TFT-LCD), an organic light-emitting diode (OLED) display, and the like. The thin film transistor-liquid crystal display controls the rotation directions of liquid crystal molecules to refract light of a backlight module to produce a picture, and has many advantages of a thin body, power saving, no radiation, and the like. The organic light emitting diode display is made of an organic electroluminescent diode, and has many advantages of being self-luminous, a short response time, high definition and contrast, flexible display, large-area full-color display, and the like.

A display panel has non-uniform luminance and severe large viewing angle color cast.

SUMMARY

An objective of the present application is to provide a display panel and a display apparatus that can effectively resolve color cast.

The present application discloses a display panel. The display panel includes: a first substrate; multiple pixels disposed on the first substrate, where the pixels include first pixels and second pixels; multiple data lines disposed on the first substrate; and multiple scan lines disposed on the first substrate, where the first pixels and the second pixels are connected to an $n^{th}$ row of data line and an $n^{th}$ row of scan line;

the first pixels each include a first primary pixel and a first secondary pixel that are disposed adjacently; the second pixels each include a second primary pixel and a second secondary pixel that are disposed adjacently; the first primary pixel and the first secondary pixel are connected to the $n^{th}$ row of scan line and the $n^{th}$ row of data line, and the second primary pixel and the second secondary pixel are connected to the $n^{th}$ row of scan line and the $n^{th}$ row of data line; and the first secondary pixel is connected to a first pull-down circuit used to pull down a charging voltage of the first secondary pixel, and the second secondary pixel is connected to a second pull-down circuit used to pull down a charging voltage of the second secondary pixel.

Optionally, the first secondary pixel includes a first secondary pixel electrode; the first pull-down circuit includes a first discharging switch and a first discharging capacitor; the second secondary pixel includes a second secondary pixel electrode; the second pull-down circuit includes a second discharging switch and a second discharging capacitor; a control terminal of the first discharging switch is connected to an $(n+1)^{th}$ row of scan line, a source terminal is connected to the first secondary pixel electrode, and a drain terminal is connected to the first discharging capacitor; and a control terminal of the second discharging switch is connected to the $(n+1)^{th}$ row of scan line, a source terminal is connected to the second secondary pixel electrode, and a drain terminal is connected to the second discharging capacitor.

Optionally, the first substrate includes a common electrode wire; the first secondary pixel electrode and the common electrode wire partially overlap to form the first discharging capacitor; and the second secondary pixel electrode and the common electrode wire partially overlap to form the second discharging capacitor.

Optionally, a capacitance of the first discharging capacitor is different from a capacitance of the second discharging capacitor.

Optionally, a pull-down effect of the first pull-down circuit is different from a pull-down effect of the second pull-down circuit.

Optionally, the first primary pixel includes a first primary switch, the first secondary pixel includes a first secondary switch, the second primary pixel includes a second primary switch, and the second secondary pixel includes a second secondary switch; a leakage current of the first primary switch is different from a leakage current of the second primary switch; and a leakage current of the first secondary switch is different from a leakage current of the second secondary switch.

Optionally, the first secondary pixel includes a first secondary pixel electrode; the second secondary pixel includes a second secondary pixel electrode; the first pull-down circuit includes a first pull-down resistor, and the second pull-down circuit includes a second pull-down resistor whose resistance is different from a resistance of the first pull-down resistor; one end of the first pull-down resistor is connected to the first secondary pixel electrode, and the other end is connected to a common electrode wire or an $(n+1)^{th}$ row of scan line; and one end of the second pull-down resistor is connected to the second secondary pixel electrode, and the other end is connected to a common electrode wire or the $(n+1)^{th}$ row of scan line.

Optionally, the first primary pixel includes a first primary pixel electrode, and the second primary pixel includes a second primary pixel electrode; the first secondary pixel includes a first secondary pixel electrode, and the second secondary pixel includes a second secondary pixel electrode: a pattern of the first primary pixel electrode is different from a pattern of a second primary pixel electrode; and a pattern of the first secondary pixel electrode is different from a pattern of a second secondary pixel electrode The present application further discloses a display panel. The display panel includes:

a first substrate; multiple pixels disposed on the first substrate, where the pixels include first pixels and second pixels; multiple data lines disposed on the first substrate; and multiple scan lines disposed on the first substrate, where the first pixels and the second pixels are connected to an $n^{th}$ row of data line and an $n^{th}$ row of scan line; the first pixels each include a first primary pixel and a first secondary pixel that are disposed adjacently, and the second pixels each include a second primary pixel and a second secondary pixel that are disposed adjacently; the first secondary pixel includes a first secondary pixel electrode and a first secondary switch, a control terminal of the first secondary switch is connected to the $n^{th}$ row of scan line, a source terminal is connected to the $n^{th}$ row of data line, and a drain terminal is connected to the first secondary pixel electrode; the second secondary pixel includes a second secondary pixel electrode and a second secondary switch, a control terminal of the second secondary switch is connected to the $n^{th}$ row of scan line, a source terminal is connected to the $n^{th}$ row of data line, and a drain terminal is connected to the first secondary pixel electrode; the first secondary pixel includes a first discharging switch and a first discharging capacitor; the second secondary pixel includes a second discharging switch and a second discharging capacitor; a control terminal of the first discharging switch is connected to an $(n+1)^{th}$ row of scan line, a source terminal is connected to the first secondary pixel electrode, and a drain terminal is connected to the first discharging capacitor; and a control terminal of the second discharging switch is connected to the $(n+1)^{th}$ row of scan line, a source terminal is connected to the second secondary pixel electrode, and a drain terminal is connected to the second discharging capacitor.

The present application further discloses a display apparatus. The display apparatus includes the display panel.

In the present application, the pixels include architecture of the first pixels and the second pixels, and the first pixels and the second pixels are connected to a same row of data line and a same row of scan line. The first pixels each are divided into the first primary pixel and the first secondary pixel, the second pixels each are divided into the second primary pixel and the second secondary pixel, the first pixels each include the first primary pixel and the first secondary pixel having different charging voltages, and the second pixels each include the second primary pixel and the second secondary pixel having different charging voltages. In this way, the pixels connected to the same row of data line and the same row of scan line may correspond to two different electrical potentials according to needs, to cooperate with a Gamma voltage to perform color cast compensation, so that large viewing angle color cast of the display panel especially the display panel in a vertical alignment display (VA) mode can be effectively resolved. Compensation can be flexibly performed for non-uniform luminance and color cast for four different corresponding electrical potentials according to needs, so that the display panel has a very good display effect.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts. In the accompanying drawings.

DETAILED DESCRIPTION

Figure 1:
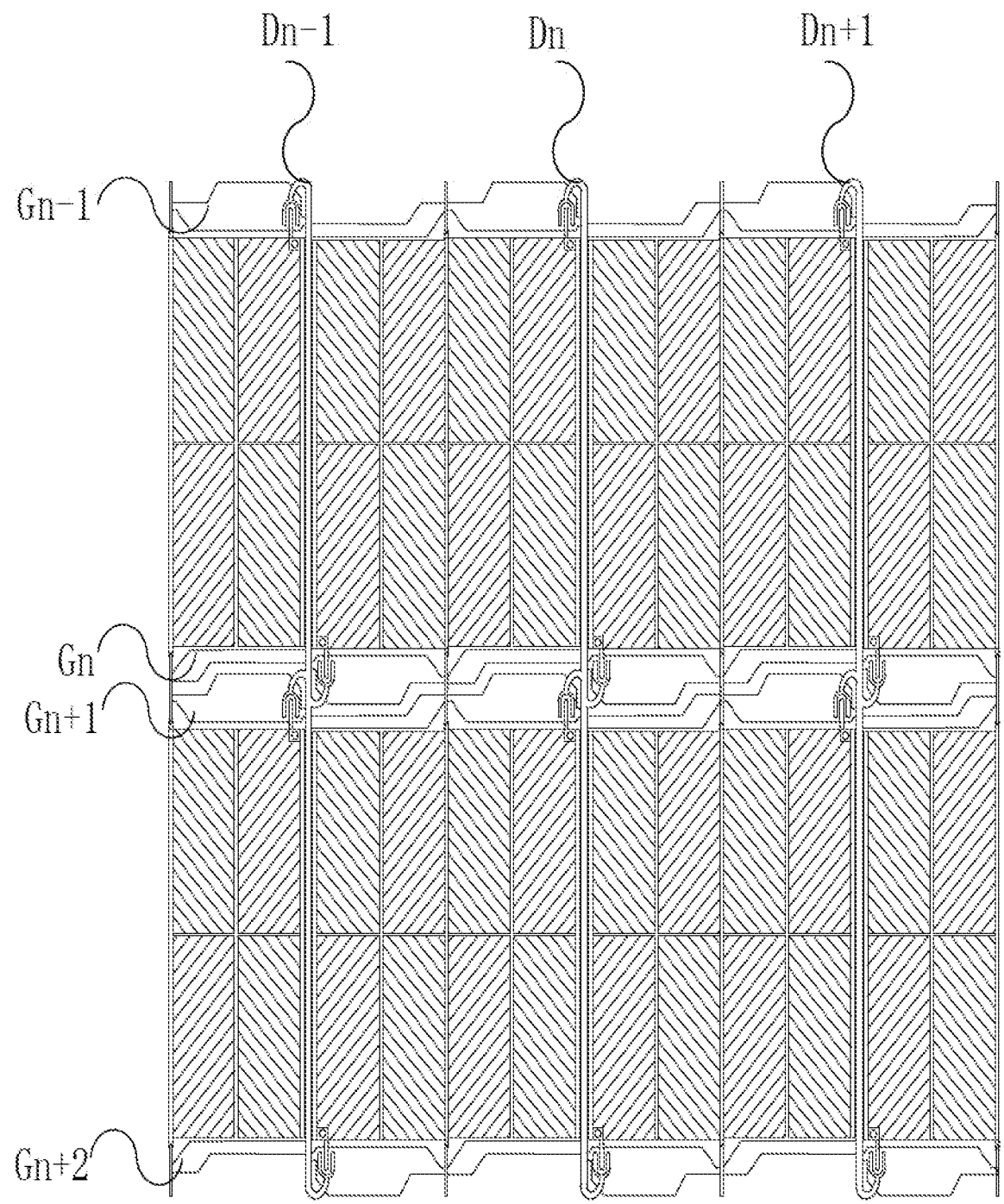
FIG. 1 is a schematic structural diagram of a display panel according to an embodiment of the present application.

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms such as "first" and "second" are merely for a descriptive purpose, and cannot be understood as indicating or implying relative importance, or implicitly indicating the number of the indicated technical features. Hence, the features defined by "first" and "second" can explicitly or implicitly include one or more features. In the description of the present application, "a plurality of" means two or more, unless otherwise provided. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected; mechanically connected or coupled; or directly connected or indirectly connected through an intermediate medium, or in an internal communication between two elements. The specific meanings about the foregoing terms in the present application may be understood by those skilled in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "include" and/or "include" used herein specify the presence of the stated features, integers, steps, operations, elements and/or components, but do not preclude the presence or addition of one or more other features, integers, steps, operations, elements, components and/or combinations thereof.

The present application is further described with reference to the accompanying drawings and optional embodiments.

As shown in FIG. 1 to FIG. 5, an embodiment of the present application discloses a display panel 200. The display panel 200 includes: a first substrate; multiple pixels 100, disposed on the first substrate, where the pixels include first pixels 110 and second pixels 120; multiple data lines, disposed on the first substrate; and multiple scan lines, disposed on the first substrate. The first pixels 110 and the second pixels 120 are connected to an $n^{th}$ row of data line and an $n^{th}$ row of scan line; the first pixels 100 each include a first primary pixel 111 and a first secondary pixel 113 that are disposed adjacently, and the second pixels 120 each include a second primary pixel 121 and a second secondary pixel 123 that are disposed adjacently; the first primary pixel 111 and the first secondary pixel 113 are connected to the $n^{th}$ row of scan line and the $n^{th}$ row of data line, and the second primary pixel 121 and the second secondary pixel 123 are connected to the $n^{th}$ row of scan line and the $n^{th}$ row of data line; and the first secondary pixel 113 is connected to a first pull-down circuit 115 used to pull down a charging voltage of the first secondary pixel 113, and the second secondary pixel 123 is connected to a second pull-down circuit 125 used to pull down a charging voltage of the second secondary pixel 123.

Figure 2:
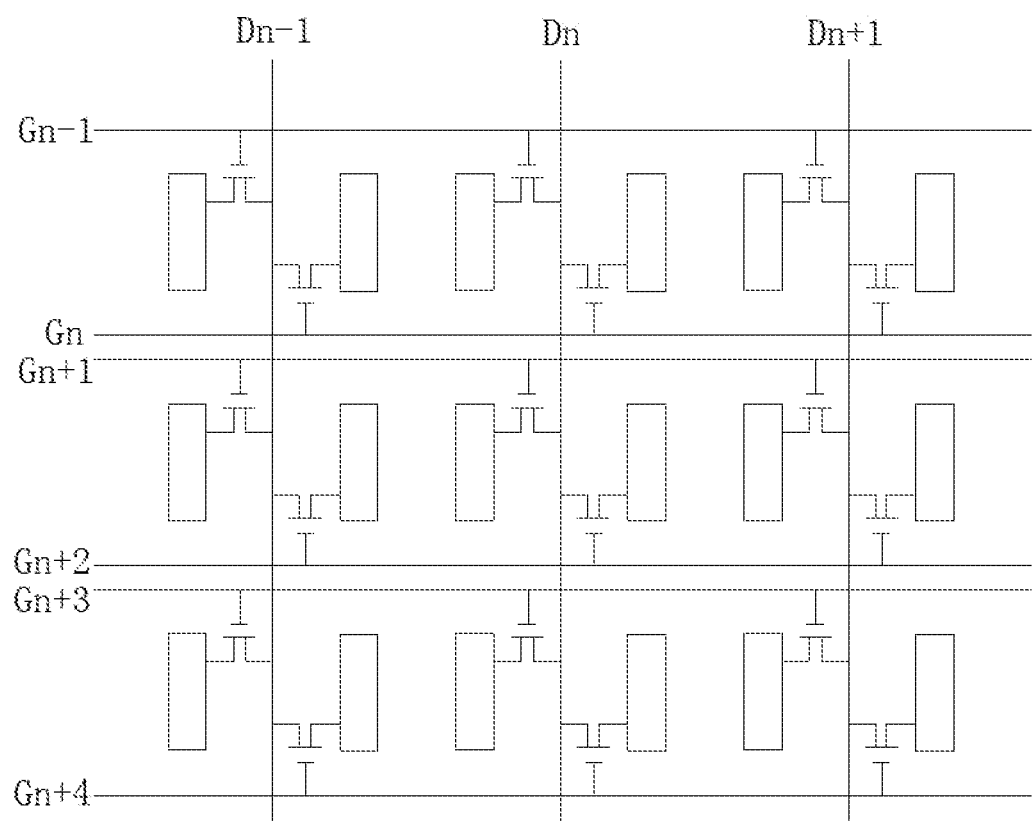
FIG. 2 is a schematic circuit diagram of a display panel according to an embodiment of the present application.
Figure 3:
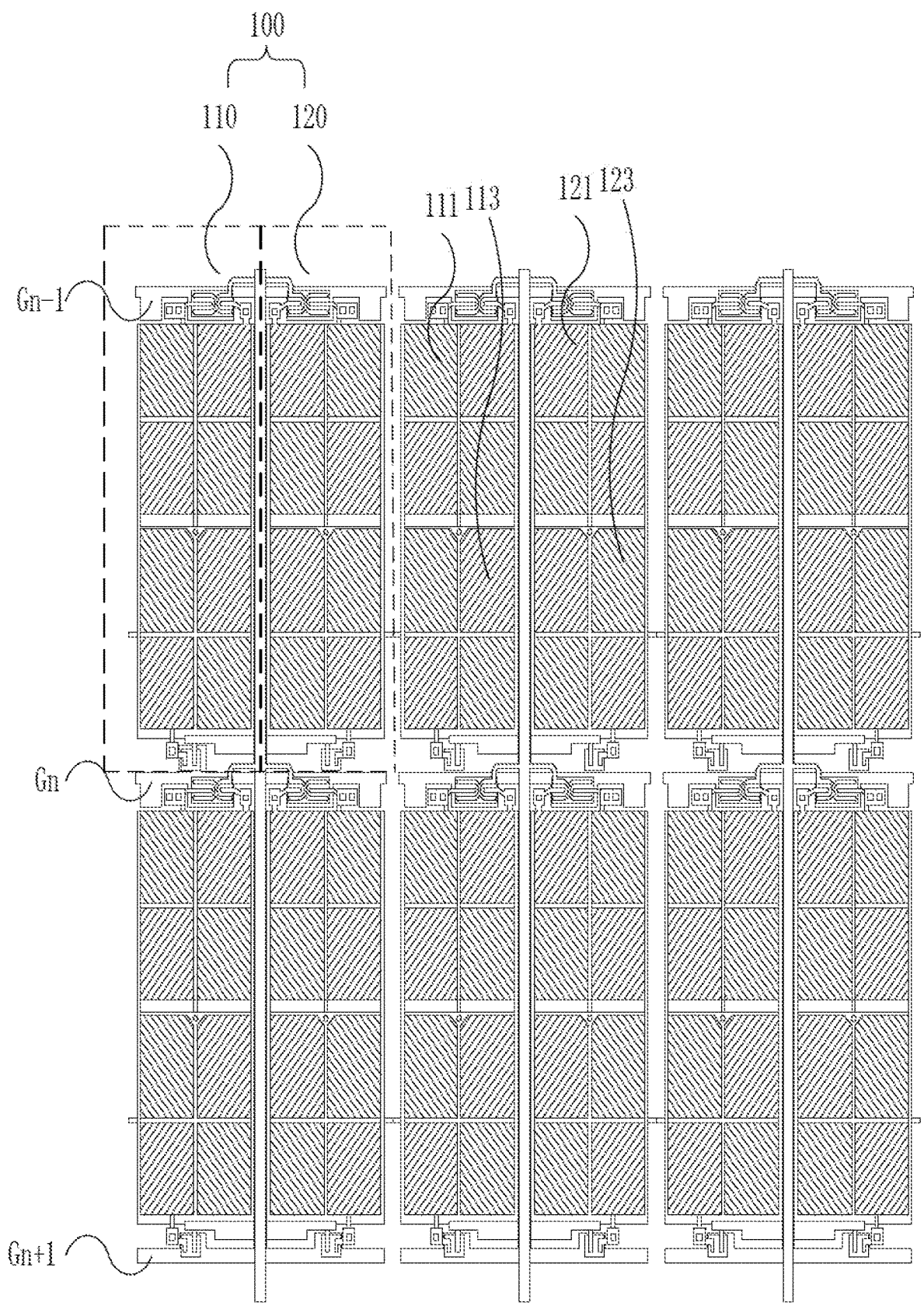
FIG. 3 is a schematic structural diagram of another display panel according to an embodiment of the present application.
Figure 4:
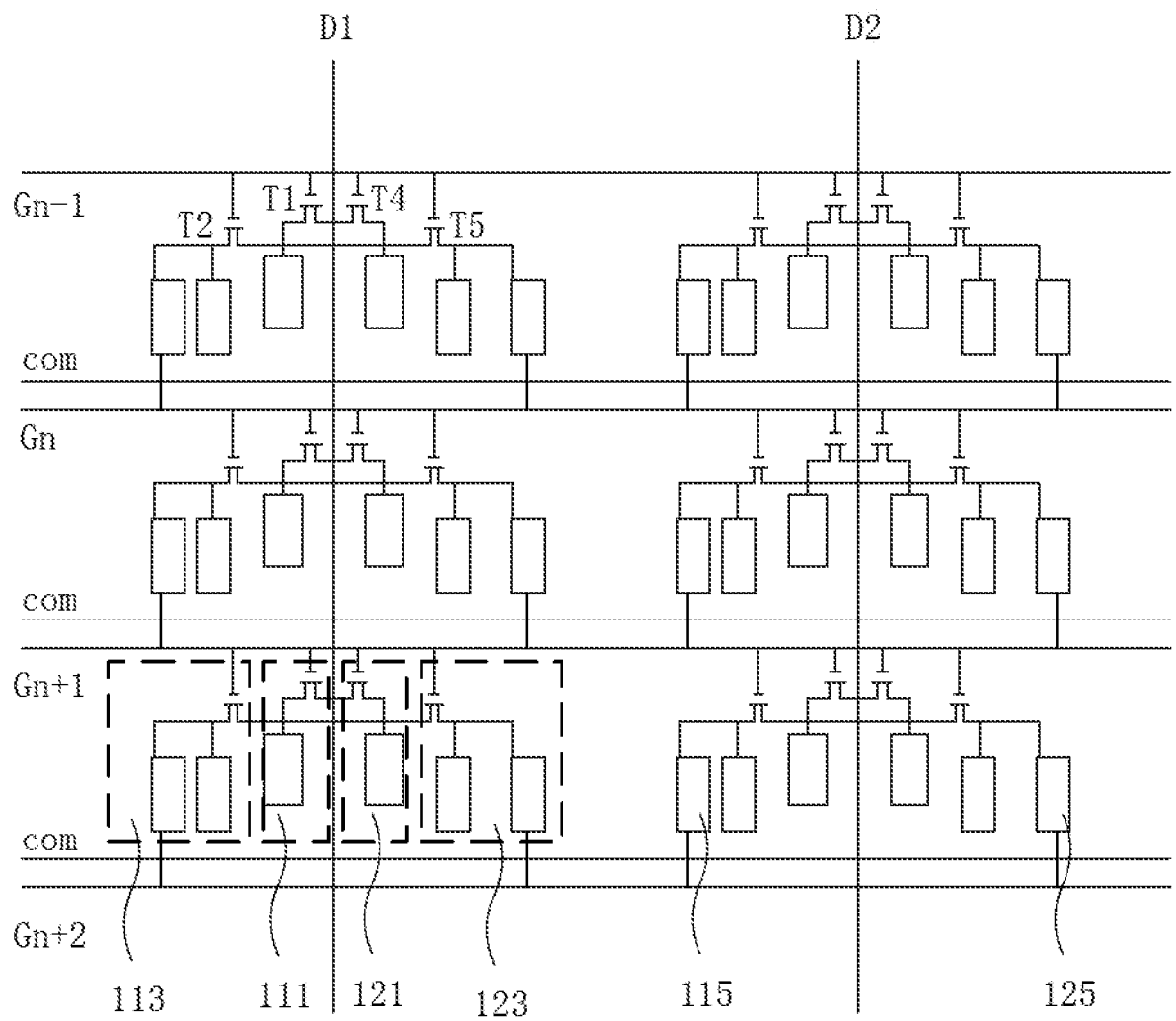
FIG. 4 is a schematic circuit diagram of another display panel according to an embodiment of the present application.

Relative to pixel architecture in FIG. 1 and FIG. 2, in the present application, the pixels include architecture of the first pixels 110 and the second pixels 120, and the first pixels 110 and the second pixels 120 are connected to a same row of data line and a same row of scan line. The first pixels 110 each are divided into the first primary pixel 111 and the first secondary pixel 113, the second pixels 120 each are divided into the second primary pixel 121 and the second secondary pixel 123, the first pixels 110 each include the first primary pixel 111 and the first secondary pixel 113 having different charging voltages, and the second pixels 120 each include the second primary pixel 121 and the second secondary pixel 123 having different charging voltages. In this way, the pixels connected to the same row of data line and the same row of scan line may correspond to two different electrical potentials according to needs, and cooperate with a Gamma voltage to perform color cast compensation, so that large viewing angle color cast of the display panel 200 especially the display panel 200 in a vertical alignment display (VA) mode can be effectively resolved. Compensation can be flexibly performed for non-uniform luminance and color cast for four different corresponding electrical potentials according to needs, so that the display panel 200 has a very good display effect.

Figures 5, 6:
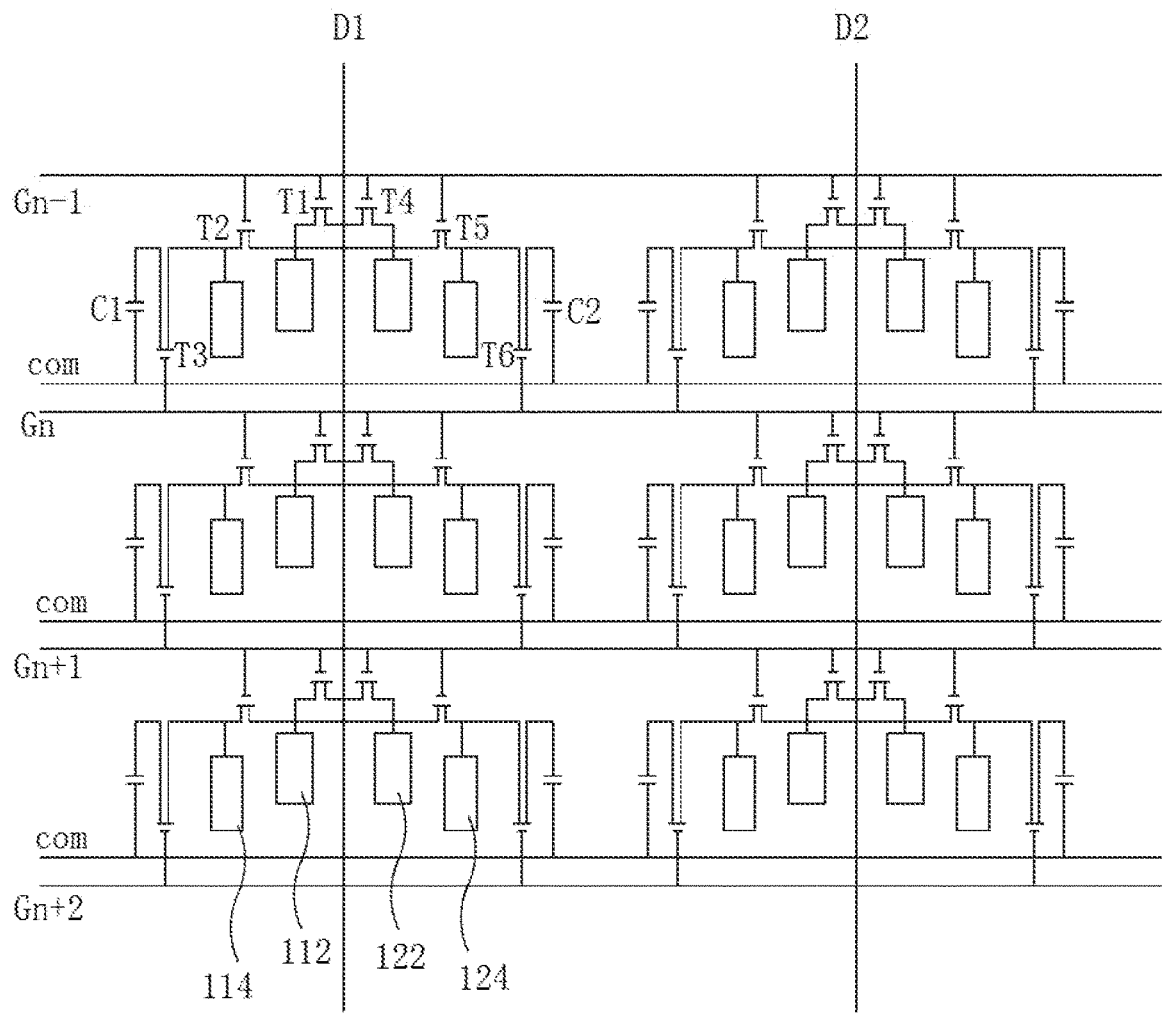
FIG. 5 is a schematic circuit diagram of another display panel according to an embodiment of the present application.
FIG. 6 is a schematic structural diagram of a display apparatus according to an embodiment of the present application.

As shown in FIG. 5, in an embodiment, the first secondary pixel 113 includes a first secondary pixel electrode 114; the first pull-down circuit 115 includes a first discharging switch T3 and a first discharging capacitor C1; the second secondary pixel 123 includes a second secondary pixel electrode 124; the second pull-down circuit 125 includes a second discharging switch T6 and a second discharging capacitor C2; a control terminal of the first discharging switch T3 is connected to an $(n+1)^{th}$ row of scan line, a source terminal is connected to the first secondary pixel electrode 114, and a drain terminal is connected to the first discharging capacitor C1; and a control terminal of the second discharging switch T6 is connected to the $(n+1)^{th}$ row of scan line, a source terminal is connected to the second secondary pixel electrode 124, and a drain terminal is connected to the second discharging capacitor C2.

In this solution, the first primary pixel 111 includes a first primary pixel electrode 112, and the second primary pixel 121 includes a second primary pixel electrode 122. The first secondary pixel electrode 114 is discharged by using the first discharging capacitor C1, and the second secondary pixel electrode 124 is discharged by using the second discharging capacitor C2. The same row of scan line is connected to the first secondary pixel electrode 114 and the second secondary pixel electrode 124 by using the first discharging switch T3 and the second discharging switch T6, so that the same row of scan line may correspond, according to needs, to the first secondary pixel electrode 114 whose electrical potential is different from an electrical potential of the first primary pixel electrode 112 and the second secondary pixel electrode 124 whose electrical potential is different from an electrical potential of the second primary pixel electrode 122, and even the first secondary pixel electrode 114 and the second secondary pixel electrode 124 may correspond to different electrical potentials according to needs, so that bright pixels and dark pixels are flexibly set, to cooperate with other color cast compensation operations including a Gamma voltage, thereby effectively resolving large viewing angle color cast of the display panel 200. Certainly, the first discharging switch T3 and the second discharging switch T6 may not be used, that is, a discharging time of a discharging capacitor may not be controlled. Specifically, the first secondary pixel includes the first secondary pixel electrode, the first pull-down circuit includes the first discharging capacitor, the second secondary pixel includes the second secondary pixel electrode, the second pull-down circuit includes the second discharging capacitor, the first secondary pixel electrode is connected to the first discharging capacitor, and the first secondary pixel electrode is connected to the second discharging capacitor. However, a relatively high requirement is imposed on the first discharging capacitor C1 and the second discharging capacitor C2, to achieve a preset luminance difference. In addition, the control terminal of the first discharging switch T3 and the control terminal of the second discharging switch T6 may be connected to the $n^{th}$ row of scan line, the $(n+1)^{th}$ row of scan line, or another row of scan line.

In an embodiment, the first substrate includes a common electrode wire; the first secondary pixel electrode 114 and the common electrode wire partially overlap to form the first discharging capacitor C1; and the second secondary pixel electrode 124 and the common electrode wire partially overlap to form the second discharging capacitor C2.

In this solution, the $n^{th}$ row of scan line, the $(n+1)^{th}$ row of scan line, or another row of scan line may be used to control the first discharging capacitor C1 and the second discharging capacitor C2 to discharge the first secondary pixel electrode 114 and the second secondary pixel electrode 124, so that the first pixels 110 each include the first primary pixel 111 and the first secondary pixel 113 having different electrical potentials, and the second pixels 120 each include the second primary pixel 121 and the second secondary pixel 123 having different electrical potentials. Based on this architecture, it helps to resolve the large viewing angle color cast of the display panel 200, and an optional display effect is achieved.

In an embodiment, a capacitance of the first discharging capacitor C1 is different from a capacitance of the second discharging capacitor C2. In this solution, because the capacitance of the first discharging capacitor is different from the capacitance of the second discharging capacitor C2, when controlled by a same scan line and receiving a same data signal, the first secondary pixel 113 and the second secondary pixel 123 have different luminance, so that for the same scan line and the same data signal, pixel electrodes of the first pixels 110 and the second pixels 120 may include at least three different voltage levels, and compared with pixels including two voltage levels, bright pixels and dark pixels can be set more flexibly, and it helps to resolve large viewing angle color cast of the display panel 200. In addition, because a voltage level is adjusted more flexibly, a same data signal may be presented in different luminance display effects, so that a same data line and a same scan line drive two different pixels, that is, pixel resolution is doubled when the scan line and the data line is not changed.

For example, the $n^{th}$ row of data line receives a data signal having grayscale luminance (200, 200, 200), according to the architecture of this solution, the first pixels 110 may be presented as images corresponding to the grayscale luminance (200, 200, 200) and grayscale luminance (198, 198, 198), and the second pixels 120 may be presented as images corresponding to the grayscale luminance (200, 200, 200) and the grayscale luminance (198, 198, 198). On the basis of setting an appropriate capacitance and performing appropriate signal processing, when the data line signal is not changed, resolution of the data signal may be doubled in terms of a display effect, thereby indirectly improving resolution.

In an embodiment, a pull-down effect of the first pull-down circuit 115 is different from a pull-down effect of the second pull-down circuit 125. In this solution, because the pull-down effect of the first pull-down circuit 115 is different from the pull-down effect of the second pull-down circuit 125, when controlled by a same scan line and receiving a same data signal, the first secondary pixel 113 and the second secondary pixel 123 have different luminance, so that for the same scan line and the same data signal, luminance of the first pixels 110 is different from luminance of the second pixels 120. Therefore, when the scan line and the data line are not changed, resolution of the pixels is doubled, and when the data signal is not changed, according to the pixel structure in this solution, resolution of a same image is improved from A resolution to 2 A resolution. Particularly, when a low-resolution image is viewed, the image can be viewed more clearly by using the display panel 200 of this solution. In this solution, not only the large viewing angle color cast is improved, but also under same resolution, a single-row scanning time in this solution is increased, a charging time is increased, and manufacturing costs of the display panel 200 are reduced. Luminance of pixels at two sides is different, and pixels at each side include primary pixels and secondary pixels having different luminance, so that color cast is further improved, and design space of the display panel 200 and design freedom of the display panel 200 are improved.

In an embodiment, the first primary pixel includes a first primary pixel electrode, and the second primary pixel includes a second primary pixel electrode; the first secondary pixel includes a first secondary pixel electrode, and the second secondary pixel includes a second secondary pixel electrode; a pattern of the first primary pixel electrode 112 is different from a pattern of the second primary pixel electrode 122; and a pattern of the first secondary pixel electrode 114 is different from a pattern of the second secondary pixel electrode 124.

In this solution, the pattern of the first primary pixel electrode 112 is different from the pattern of the second primary pixel electrode 122, the pattern of the first secondary pixel electrode 114 is different from the pattern of the second secondary pixel electrode 124, different domains may be set, and an aperture ratio of the first secondary pixel electrode 114 may be the same as or different from an aperture ratio of the second secondary pixel electrode 124. When controlled by a same scan line and receiving a same data signal, the first primary pixel 111, the second primary pixel 121, the first secondary pixel 113, and the second secondary pixel 123 have different voltages and different luminance, so that color cast of the display panel 200 is further improved, design space and design freedom of the display panel 200 are improved, a single-row scanning time is increased, and a charging time is increased. The first primary pixel electrode 112 and the second primary pixel electrode 122 may be made of different materials, or may be made by using different processes, so that an aperture ratio of the first primary pixel electrode 112 is different from an aperture ratio of the second primary pixel electrode 122.

In an embodiment, the first primary pixel 111 includes a first primary switch T1, the first secondary pixel 113 includes a first secondary switch T2, the second primary pixel 121 includes a second primary switch T4, and the second secondary pixel 123 includes a second secondary switch T5; a leakage current of the first primary switch T1 is different from a leakage current of the second primary switch T4; and a leakage current of the first secondary switch T2 is different from a leakage current of the second secondary switch T5.

In this solution, the leakage current of the first primary switch T1 is different from the leakage current of the second primary switch T4, so that a final charging voltage of the first primary pixel 111 is different from a final charging voltage of the second primary pixel 121. In addition, when an aperture ratio of the display panel 200 is not affected, the luminance of the first primary pixel 111 is different from the luminance of the second primary pixel 121. The leakage current of the first secondary switch T2 is different from the leakage current of the second secondary switch T5, so that a final charging voltage of the first secondary pixel 113 is different from a final charging voltage of the second secondary pixel 123. In addition, when the aperture ratio of the display panel 200 is not affected, the luminance of the first secondary pixel 113 is different from the luminance of the second secondary pixel 123. In this way, under the control of a same row of data line and a same row of scan line, the pixels may include pixel electrodes having four different electrical potentials. Based on such flexible setting of bright pixels and dark pixels, it helps to improve color cast of the display panel 200, the design space and the design freedom of the display panel 200 are improved, a single-row scanning time of the display panel 200 is increased, and a charging time of the pixels is increased.

In an embodiment, the first secondary pixel 113 includes a first secondary pixel electrode 114; the second secondary pixel 123 includes a second secondary pixel electrode 124; the first pull-down circuit 115 includes a first pull-down resistor, and the second pull-down circuit 125 includes a second pull-down resistor whose resistance is different from a resistance of the first pull-down resistor; one end of the first pull-down resistor is connected to the first secondary pixel electrode 114, and the other end is connected to a common electrode wire or an $(n+1)^{th}$ row of scan line; and one end of the second pull-down resistor is connected to the second secondary pixel electrode 124, and the other end is connected to the common electrode wire or the $(n+1)^{th}$ row of scan line.

In this solution, the first pull-down resistor and the second pull-down resistor are used, so that pull-down effects are different. The resistors are relatively cheap and it is convenient for manufacturing in an actual operation process. The first pull-down resistor and the second pull-down resistor have different resistances, so that the first secondary pixel electrode 114 and the second secondary pixel electrode 124 achieve different charging luminance. In this solution, one end of the first pull-down resistor may be connected to the first secondary pixel electrode 114, the other end may be connected to the common electrode wire or another row of scan line, one end of the second pull-down resistor may be connected to the second secondary pixel electrode 124, and the other end may be connected to the common electrode wire or another row of scan line.

In addition, a larger resistance of a resistor indicates a smaller aperture ratio. Correspondingly, a larger resistance indicates a more obvious pull-down effect of luminance of a secondary pixel electrode, and a smaller aperture ratio indicates a greater pull-down effect of the luminance of the secondary pixel electrode. In this way, they are supplementary to each other. When a resistance difference between resistors is relatively small, aperture ratios may be used as a supplement, to achieve a relatively great luminance difference.

In another embodiment of the present application, as shown in FIG. 1 to FIG. 5, a display panel 200 is disclosed. The display panel 200 includes: a first substrate; multiple pixels disposed on the first substrate, where the pixels include first pixels 110 and second pixels 120; multiple data lines disposed on the first substrate; and multiple scan lines disposed on the first substrate. The first pixels 110 and the second pixels 120 are connected to an $n^{th}$ row of data line and an $n^{th}$ row of scan line; the first pixels 110 each include a first primary pixel 111 and a first secondary pixel 113 that are disposed adjacently, and the second pixels 120 each include a second primary pixel 121 and a second secondary pixel 123 that are disposed adjacently; the first primary pixel 111 includes a first primary pixel electrode 112 and a first primary switch T1, a control terminal of the first primary switch T1 is connected to the $n^{th}$ row of scan line, a source terminal is connected to the $n^{th}$ row of data line, and a drain terminal is connected to the first primary pixel electrode 112; the second primary pixel 121 includes a second primary pixel electrode 122 and a second primary switch T4, a control terminal of the second primary switch T4 is connected to the $n^{th}$ row of scan line, a source terminal is connected to the $n^{th}$ row of data line, and a drain terminal is connected to the second primary pixel electrode 122; the first secondary pixel 113 includes a first secondary pixel electrode 114 and a first secondary switch T2, a control terminal of the first secondary switch T2 is connected to the $n^{th}$ row of scan line, a source terminal is connected to the $n^{th}$ row of data line, and a drain terminal is connected to the first secondary pixel electrode 114; the second secondary pixel 123 includes a second secondary pixel electrode 124 and a second secondary switch T5, a control terminal of the second secondary switch T5 is connected to the $n^{th}$ row of scan line, a source terminal is connected to the $n^{th}$ row of data line, and a drain terminal is connected to the first secondary pixel electrode 114; the first secondary pixel 113 includes a first discharging switch T3 and a first discharging capacitor C1; the second secondary pixel 123 includes a second discharging switch T6 and a second discharging capacitor C2; a control terminal of the first discharging switch T3 is connected to an $(n+1)^{th}$ row of scan line, a source terminal is connected to the first secondary pixel electrode 114, and a drain terminal is connected to the first discharging capacitor C1; and a control terminal of the second discharging switch T6 is connected to the $(n+1)^{th}$ row of scan line, a source terminal is connected to the second secondary pixel electrode 124, and a drain terminal is connected to the second discharging capacitor C2.

In the present application, the pixels include architecture of the first pixels 110 and the second pixels 120. The first pixels 110 and the second pixels 120 are connected to a same row of data line and a same row of scan line. The first pixels 110 each are divided into the first primary pixel 111 and the first secondary pixel 113, the second pixels 120 each are divided into the second primary pixel 121 and the second secondary pixel 123, the first secondary pixel electrode 114 is discharged by using the first discharging capacitor C1, and the second secondary pixel electrode 124 is discharged by using the second discharging capacitor C2. The same row of scan line is connected to the first secondary pixel electrode 114 and the second secondary pixel electrode 124 by using the first discharging switch T3 and the second discharging switch T6, so that the same row of scan line may correspond, according to needs, to the first secondary pixel electrode 114 whose electrical potential is different from an electrical potential of the first primary pixel electrode 112 and the second secondary pixel electrode 124 whose electrical potential is different from an electrical potential of the second primary pixel electrode 122, and the first secondary pixel electrode 114 and the second secondary pixel electrode 124 may correspond to different electrical potentials according to needs. Therefore, bright pixels and dark pixels are flexibly set, to cooperate with other color cast compensation operations including a Gamma voltage, and large viewing angle color cast of the display panel 200 can be effectively resolved. Certainly, the first discharging switch T3 and the second discharging switch T6 may not be used, that is, a discharging time of a discharging capacitor may not be controlled. However, a relatively high requirement is imposed on the first discharging capacitor C1 and the second discharging capacitor C2, to achieve a preset luminance difference. In addition, the control terminals of the first discharging switch T3 and the second discharging switch T6 may be connected to the $n^{th}$ row of scan line, the $(n+1)^{th}$ row of scan line, or another row of scan line.

In another embodiment of the present application, as shown in FIG. 6, a display apparatus 300 is disclosed. The display apparatus 300 includes the display panel 200.

In the present application, the parameter n is a natural number greater than or equal to 1.

The technical solutions of the present application may be widely applied to a twisted nematic (TN) panel, an in-plane switching (IPS) panel, a vertical alignment (VA) panel, and a multi-domain vertical alignment (MVA) panel. Certainly, there may be another type of panel provided that the technical solutions are applicable to the panel.

The foregoing is a detailed description of the present application with reference to specific optional embodiments, and it should not be considered that the specific implementation of the present application is limited to the description. A person of ordinary skill in the art of the present application may further make several simple deductions or substitutions without departing from the concept of the present application, and the deductions or substitutions shall fall within the protection scope of the present application.

What is claimed is:

1. A display panel, comprising:
   a first substrate;
   a plurality of pixels, disposed on the first substrate; wherein each of the pixels comprise a first pixel and a second pixel;
   a plurality of data lines, disposed on the first substrate; and a plurality of scan lines, disposed on the first substrate, wherein
the first pixel and the second pixel are each connected to an $n^{th}$ row of data line and to an $n^{th}$ row of scan line;
the first pixel comprises a first primary pixel and a first secondary pixel that are disposed adjacently, and the second pixel comprises a second primary pixel and a second secondary pixel that are disposed adjacently;
the first primary pixel and the first secondary pixel are connected to the $n^{th}$ row of scan line and to the $n^{th}$ row of data line, and the second primary pixel and the second secondary pixel are connected to the $n^{th}$ row of scan line and to the $n^{th}$ row of data line; and
wherein the first secondary pixel is connected to a first pull-down circuit used to pull down a charging voltage of the first secondary pixel, and the second secondary pixel is connected to a second pull-down circuit used to pull down a charging voltage of the second secondary pixel;
wherein the first secondary-pixel comprises a first secondary pixel electrode, the first pull-down circuit comprises a first discharging switch and a first discharging capacitor, the second secondary pixel comprises a second secondary pixel electrode, and the second pull-down circuit comprises a second discharging switch and a second discharging capacitor;
a control terminal of the first discharging switch is directly connected to an $(n+1)^{th}$ row of scan line, a source terminal of the first discharging switch is directly connected to the first secondary pixel electrode, and a drain terminal of the first discharging switch is directly connected to the first discharging capacitor; and
a control terminal of the second discharging switch is directly connected to the $(n+1)^{th}$ row of scan line, a source terminal of the second discharging switch is directly connected to the second secondary pixel electrode, and a drain terminal of the second discharging switch is directly connected to the second discharging capacitor.

2. The display panel according to claim 1, wherein the control terminal of the first discharging switch and the control terminal of the second discharging switch are each directly connected to the $n^{th}$ row of scan line.

3. The display panel according to claim 1, wherein the control terminal of the first discharging switch and the control terminal of the second discharging switch are each directly connected to the $(n+1)^{th}$ row of scan line.

4. The display panel according to claim 1, wherein the first substrate comprises a common electrode wire; and
the first secondary pixel electrode and the common electrode wire partially overlap to form the first discharging capacitor, and the second secondary pixel electrode and the common electrode wire partially overlap to form the second discharging capacitor.

5. The display panel according to claim 1, wherein a capacitance of the first discharging capacitor is different from a capacitance of the second discharging capacitor.

6. The display panel according to claim 1, wherein a pull-down effect of the first pull-down circuit is different from a pull-down effect of the second pull-down circuit.

7. The display panel according to claim 6, wherein the first primary pixel comprises a first primary switch, the first secondary pixel comprises a first secondary switch; the second primary pixel comprises a second primary switch, and the second secondary pixel comprises a second secondary switch; and a drain current of the first primary switch is different from a drain current of the second primary switch.

8. The display panel according to claim 7, wherein a drain current of the first secondary switch is different from a drain current of the second secondary switch.

9. The display panel according to claim 6, wherein the first primary pixel comprises a first primary pixel electrode, and the second primary pixel comprises a second primary pixel electrode;
the first secondary pixel comprises a first secondary pixel electrode, and the second secondary pixel comprises a second secondary pixel electrode;
a pattern of the first primary pixel electrode is different from a pattern of a second primary pixel electrode; and
a pattern of the first secondary pixel electrode is different from a pattern of a second secondary pixel electrode.

10. The display panel according to claim 6, wherein the first primary pixel comprises a first primary pixel electrode, and the second primary pixel comprises a second primary pixel electrode; the first primary pixel electrode and the second primary pixel electrode are made of different materials.

11. The display panel according to claim 6, wherein the first primary pixel comprises a first primary pixel electrode, and the second primary pixel comprises a second primary pixel electrode; the first primary pixel electrode and the second primary pixel electrode are made by using different processes, and an aperture ratio of the first primary pixel electrode is different from an aperture ratio of the second primary pixel electrode.

12. A display panel, comprising:
a first substrate;
a plurality of pixels, disposed on the first substrate, wherein each of the pixels comprise a first pixel and a second pixel;
a plurality of data lines, disposed on the first substrate; and
a plurality of scan lines, disposed on the first substrate, wherein
the first pixel and the second pixel are each connected to an $n^{th}$ row of data line and to an $n^{th}$ row of scan line;
the first pixel comprises a first primary pixel and a first secondary pixel that are disposed adjacently, and the second pixel comprises a second primary pixel and a second secondary pixel that are disposed adjacently;
the first secondary pixel comprises a first secondary pixel electrode and a first secondary switch, a control terminal of the first secondary switch is directly connected to the $n^{th}$ row of scan line, a source terminal of the first secondary switch is directly connected to the $n^{th}$ row of data line, and a drain terminal of the first secondary switch is directly connected to the first secondary pixel electrode;
the second secondary pixel comprises a second secondary pixel electrode and a second secondary switch, a control terminal of the second secondary switch is directly connected to the $n^{th}$ row of scan line, a source terminal of the second secondary is directly connected to the $n^{th}$ row of data line, and a drain terminal of the second secondary is directly connected to the first secondary pixel electrode;
the first secondary pixel further comprises a first discharging switch and a first discharging capacitor, and the second secondary pixel further comprises a second discharging switch and a second discharging capacitor;
a control terminal of the first discharging switch is directly connected to an $(n+1)^{th}$ row of scan line, a source terminal of the first discharging switch is directly connected to the first secondary pixel electrode, and a drain terminal of the first discharging switch is directly connected to the first discharging capacitor; and a control terminal of the second discharging switch is directly connected to the $(n+1)^{th}$ row of scan line, a source terminal of the second discharging switch is directly connected to the second secondary pixel electrode, and a drain terminal of the second discharging switch is directly connected to the second discharging capacitor.

13. A display apparatus, comprising a display panel, and wherein the display panel comprises:

a first substrate;

a plurality of pixels, disposed on the first substrate, wherein each of the pixels comprise a first pixel and a second pixel;

a plurality of data lines, disposed on the first substrate; and a plurality of scan lines, disposed on the first substrate, wherein the first pixel and the second pixel are each connected to an $n^{th}$ row of data line and to an $n^{th}$ row of scan line;

the first pixel comprises a first primary pixel and a first secondary pixel that are disposed adjacently, and the second pixel comprises a second primary pixel and a second secondary pixel that are disposed adjacently;

the first primary pixel and the first secondary pixel are connected to the $n^{th}$ row of scan line and to the $n^{th}$ row of data line, and the second primary pixel and the second secondary pixel are connected to the $n^{th}$ row of scan line and to the $n^{th}$ row of data line; and wherein the first secondary pixel is connected to a first pull-down circuit used to pull down a charging voltage of the first secondary pixel, and the second secondary pixel is connected to a second pull-down circuit used to pull down a charging voltage of the second secondary pixel;

wherein the first secondary pixel comprises a first secondary pixel electrode, the first pull-down circuit comprises a first discharging switch and a first discharging capacitor, the second secondary pixel comprises a second secondary pixel electrode, and the second pull-down circuit comprises a second discharging switch and a second discharging capacitor;

a control terminal of the first discharging switch is directly connected to an $(n+1)^{th}$ row of scan line, a source terminal of the first discharging switch is directly connected to the first secondary pixel electrode, and a drain terminal of the first discharging switch is directly connected to the first discharging capacitor; and a control terminal of the second discharging switch is directly connected to the $(n+1)^{th}$ row of scan line, a source terminal of the second discharging switch is directly connected to the second secondary pixel electrode, and a drain terminal of the second discharging switch is directly connected to the second discharging capacitor.

* * * * *